(12) United States Patent
Edelen

(10) Patent No.: US 9,992,992 B1
(45) Date of Patent: Jun. 12, 2018

(54) INSECT RESTRICTION SYSTEM

(71) Applicant: Michael Edelen, Bonita Springs, FL (US)

(72) Inventor: Michael Edelen, Bonita Springs, FL (US)

( * ) Notice: Subject to any disclaimer, the term of this patent is extended or adjusted under 35 U.S.C. 154(b) by 0 days. days.

(21) Appl. No.: 15/445,395

(22) Filed: Feb. 28, 2017

(51) Int. Cl.
 *A01M 29/34* (2011.01)
 *B65D 25/48* (2006.01)
 *B65D 25/20* (2006.01)

(52) U.S. Cl.
 CPC .......... *A01M 29/34* (2013.01); *B65D 25/20* (2013.01); *B65D 25/48* (2013.01)

(58) Field of Classification Search
 CPC ....... A01M 29/34; A01M 29/30; B65D 25/20; B65D 25/48; B65D 23/00
 USPC ....... 220/730, 694; 215/11.6, 11.1, 387, 386
 See application file for complete search history.

(56) References Cited

U.S. PATENT DOCUMENTS

| | | | |
|---|---|---|---|
| 1,451,822 A * | 4/1923 | Hagerty | A61J 9/00 215/11.1 |
| 1,650,517 A | 11/1927 | Hughes | |
| 1,716,262 A | 6/1929 | Dishart | |
| 2,821,230 A | 1/1958 | May | |
| 3,473,684 A * | 10/1969 | Wagner | B65D 41/0442 215/324 |
| 6,276,551 B1 | 8/2001 | Miller, II | |
| D673,420 S | 1/2013 | Imo | |
| 8,534,486 B2 | 9/2013 | Edmunds | |
| 8,708,189 B2 | 4/2014 | Reitzig | |
| 2011/0204071 A1* | 8/2011 | Plumlee | A47G 19/2211 220/730 |
| 2013/0153590 A1* | 6/2013 | Reitzig | B65D 90/00 220/730 |

FOREIGN PATENT DOCUMENTS

| | | | | |
|---|---|---|---|---|
| DE | 29619927 U1 * | 2/1997 | | B65D 41/18 |
| DE | 102009044252 A1 * | 5/2011 | | B65D 41/22 |
| WO | WO2012087168 | 6/2012 | | |

OTHER PUBLICATIONS

Translation of DE102009044252 (Kirner), May 12, 2011, para. 14, 27, 31, 33.*

* cited by examiner

*Primary Examiner* — Robert J Hicks

(57) ABSTRACT

An insect restriction system for inhibiting insects from contaminating fluid in a container includes a container that contains a fluid. The container has an opening and a spout is positioned in the opening. A bulb is provided and the bulb is removably positioned on the spout. In this way the bulb inhibit insects from entering the spout to access the fluid.

4 Claims, 2 Drawing Sheets

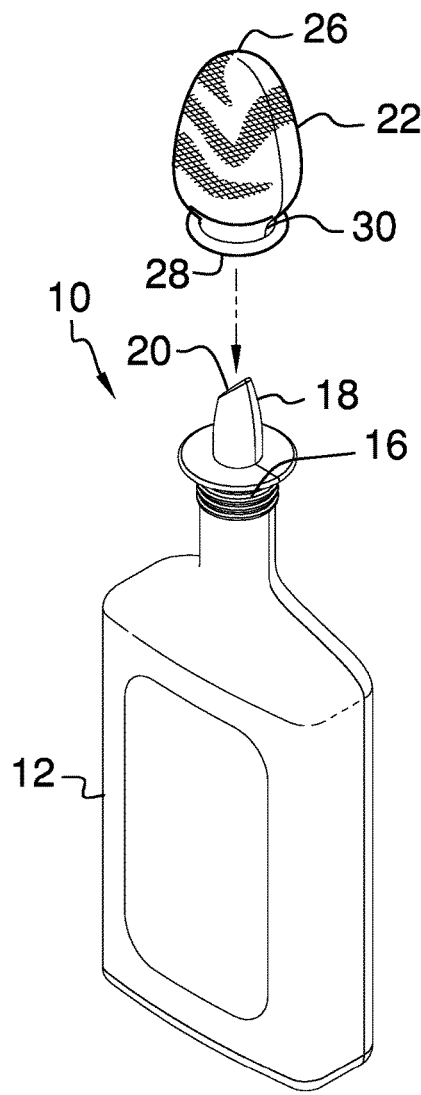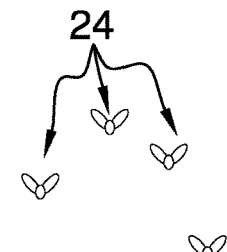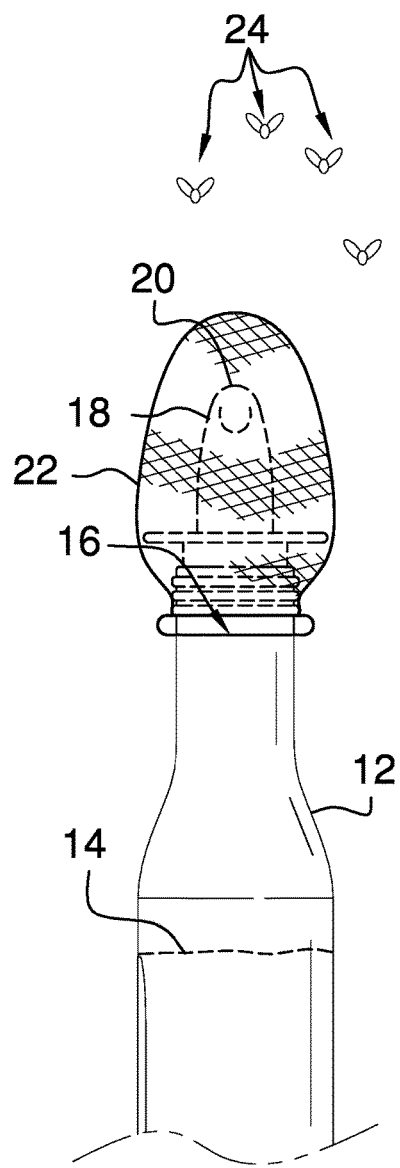
FIG. 3
FIG. 4

INSECT RESTRICTION SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM.

Not Applicable

STATEMENT REGARDING PRIOR DISCLOSURES BY THE INVENTOR OR JOINT INVENTOR

Not Applicable

BACKGROUND OF THE INVENTION (1) Field of the Invention.
(2) Description of Related Art including information disclosed under 37 CFR 1.97 and 1.98.

The disclosure and prior art relates to restriction devices and more particularly pertains to a new restriction device for inhibiting insects from contaminating fluid in a container.

BRIEF SUMMARY OF THE INVENTION

An embodiment of the disclosure meets the needs presented above by generally comprising a container that contains a fluid. The container has an opening and a spout is positioned in the opening. A bulb is provided and the bulb is removably positioned on the spout. In this way the bulb inhibit insects from entering the spout to access the fluid.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 3 is an exploded perspective view of an embodiment of the disclosure.

FIG. 4 is a perspective view of an embodiment of the disclosure.

DETAILED DESCRIPTION OF THE INVENTION

Figure 1:
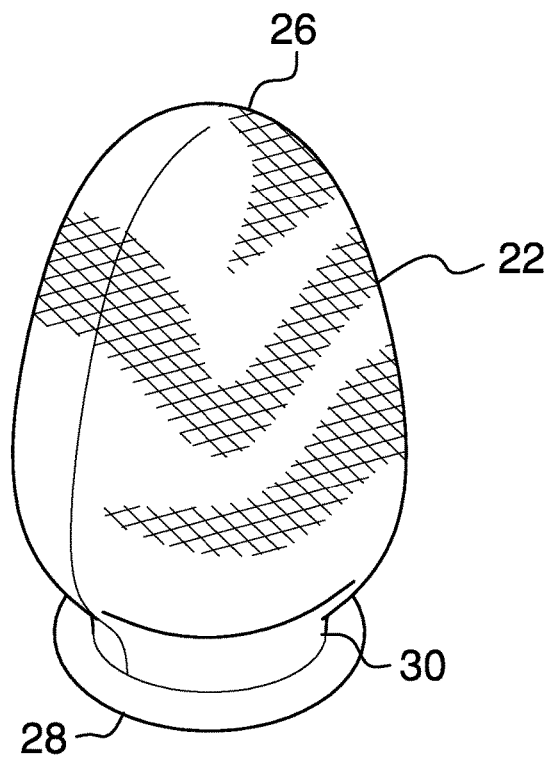
FIG. 1 is a perspective view of a blub of an insect restriction system according to an embodiment of the disclosure.
Figure 2:
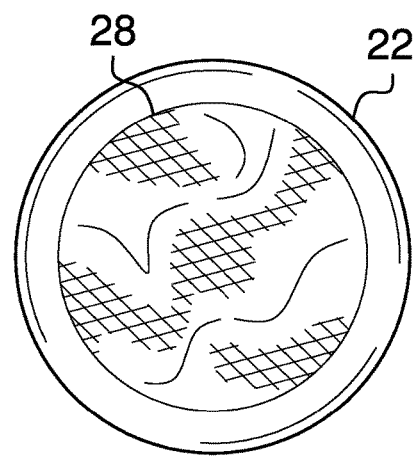
FIG. 2 is a bottom view of a bulb of an embodiment of the disclosure.

With reference now to the drawings, and in particular to FIGS. 1 through 4 thereof, a new restriction device embodying the principles and concepts of an embodiment of the disclosure and generally designated by the reference numeral 10 will be described.

As best illustrated in FIGS. 1 through 4, the insect restriction system 10 generally comprises a container 12 that may contain a fluid 14. The container 12 may be a wine bottle, a liquor bottle, a can or any other beverage container 12. The fluid 14 in the container 12 may be wine, liquor, juice of any other fluid commonly known to attract fruit flies. Moreover, the container 12 may be positioned in a business environment such as a bar or the like.

The container 12 has an opening 16 and a spout 18 is removably positioned in the opening 16. The spout 18 has a distal end 20 with respect to the opening 16. The distal end 20 is open to selectively pour the fluid 14. The spout 18 may be a pour spout or the like.

A bulb 22 is provided and the bulb 22 is removably positioned on the spout 18. The bulb 22 inhibits insects 24 from entering the spout 18 to access the fluid 14. The insects 24 may be fruit flies or any other insect attracted to the fluid 14 in the container 12. The bulb 22 has a closed end 26 and an open end 28. Moreover, the bulb 22 is comprised of a mesh material to pass air therethrough. The open end 28 insertably receives the distal end 20 of the spout 18 when the bulb 22 is positioned on the spout 18. The bulb 22 is be elongated between the closed end 26 and the open end 28 such that the bulb 22 has an ovoid shape. In this way the bulb 22 accommodates a variety of spout 18 lengths.

An elastic member 30 is provided and the elastic member 30 is coupled around the bulb 22. The elastic member 30 is spaced from and is coextensive with the open end 28. Moreover, the elastic member 30 urges the open end 28 to close around the spout 18 to removably retain the bulb 22 on the spout 18. Additionally, the elastic member 30 inhibits the insects 24 from passing between the bulb 22 and the container 12.

In use, the bulb 22 is positioned around the spout 18 when the container 12 is being stored. In this way the bulb 22 inhibits the insects 24 from entering the bottle and contaminating the fluid 14. The bulb 22 is removed from the spout 18 to facilitate the liquid to be poured from the spout 18. The bulb 22 is positioned back on the spout 18 when the liquid is finished being poured from the spout 18. Moreover, the bulb 22 is removed from the spout 18 and washed at any selected time.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An insect restriction system comprising:
   a container being configured to contain a fluid, said container having an opening;
   a spout being positioned in said opening; and
   a bulb being removably positioned on said spout wherein said bulb is configured to inhibit insects from entering said spout to access the fluid, said bulb having a closed end and an open end, said bulb being comprised of a mesh material wherein said bulb is configured to pass air therethrough, said open end insertably receiving said spout therethrough for positioning on said spout, said bulb having an ovoid shape including said closed end of said bulb having an inverted parabola of revolution shape wherein said bulb is rounded at said closed end and flares moving away from said closed end towards said open end, wherein said closed end is configured for facilitating pouring of a fluid poured from said spout and through said mesh material at said closed end.

2. The system according to claim 1, wherein said spout has a distal end with respect to said opening, said distal end being open wherein said spout is configured to selectively pour the fluid.

3. The system according to claim 1, further comprising an elastic member being coupled around said bulb, said elastic member being spaced from and being coextensive with said open end, said elastic member urging said open end to close around said spout to removably retain said bulb on said spout.

4. An insect restriction system comprising:
   a container being configured to contain a fluid, said container having an opening;
   a spout being positioned in said opening, said spout having a distal end with respect to said opening, said distal end being open wherein said spout is configured to selectively pour the fluid;
   a bulb being removably positioned on said spout wherein said bulb is configured to inhibit insects from entering said spout to access the fluid, said bulb having a closed end and an open end, said bulb being comprised of a mesh material wherein said bulb is configured to pass air therethrough, said open end insertably receiving said spout therethrough for positioning on said spout, said bulb having an ovoid shape including said closed end of said bulb having an inverted parabola of revolution shape wherein said bulb is rounded at said closed end and flares moving away from said closed end towards said open end, wherein said closed end is configured for facilitating pouring of a fluid poured from said spout and through said mesh material at said closed end; and
   an elastic member being coupled around said bulb, said elastic member being spaced from and being coextensive with said open end, said elastic member urging said open end to close around said spout to removably retain said bulb on said spout.

* * * * *